(12) United States Patent
Watanabe

(10) Patent No.: US 11,200,057 B2
(45) Date of Patent: Dec. 14, 2021

(54) ARITHMETIC PROCESSING APPARATUS AND METHOD FOR CONTROLLING ARITHMETIC PROCESSING APPARATUS

(71) Applicant: FUJITSU LIMITED, Kawasaki (JP)

(72) Inventor: Shingo Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 265 days.

(21) Appl. No.: 15/964,197

(22) Filed: Apr. 27, 2018

(65) Prior Publication Data

US 2018/0329710 A1    Nov. 15, 2018

(30) Foreign Application Priority Data

May 15, 2017  (JP) .............................. JP2017-096400

(51) Int. Cl.
  *G06F 9/30*    (2018.01)
  *G06F 9/34*    (2018.01)
  *G06F 9/345*   (2018.01)
  *G06F 12/0875* (2016.01)

(52) U.S. Cl.
  CPC ........ *G06F 9/30043* (2013.01); *G06F 9/3455* (2013.01); *G06F 9/3001* (2013.01); *G06F 9/30047* (2013.01); *G06F 9/30098* (2013.01); *G06F 9/30145* (2013.01); *G06F 12/0875* (2013.01); *G06F 2212/452* (2013.01)

(58) Field of Classification Search
  CPC ............. G06F 9/30043; G06F 9/30047; G06F 9/3455; G06F 2212/6026
  See application file for complete search history.

(56) References Cited

U.S. PATENT DOCUMENTS

| 6,430,680 B1 * | 8/2002 | Burky ................... G06F 9/3455 711/137 |
| 2006/0184752 A1 | 8/2006 | Takano |
| 2012/0060016 A1 * | 3/2012 | Eichenberger ...... G06F 9/30018 712/4 |
| 2016/0054997 A1 * | 2/2016 | Radhakrishnan ..... G06F 9/3455 711/137 |

FOREIGN PATENT DOCUMENTS

| JP | 2006-215799 | 8/2006 | |
| JP | 2012-128559 | 7/2012 | |
| JP | 5664198 B2 * | 2/2015 | ......... G06F 9/30036 |

OTHER PUBLICATIONS

Alex Pajuelo, Antonio Gonzalez, and Mateo Valero. Speculative dynamic vectorization. In Proceedings of the 29th annual international symposium on Computer architecture (ISCA '02). IEEE Computer Society, USA, pp. 271-280. (Year: 2002).*

* cited by examiner

*Primary Examiner* — William B Partridge
*Assistant Examiner* — Kasim Alli
(74) *Attorney, Agent, or Firm* — Fujitsu Patent Center

(57) ABSTRACT

An arithmetic processing apparatus includes: a memory; and a processor coupled to the memory, wherein the processor: detects whether intervals of a plurality of addresses to be accessed by a memory access instruction that performs memory access to the plurality of addresses by a single instruction are all the same; decodes the memory access instruction as the single instruction when detecting that the intervals are all the same; decodes the memory access instruction as a plurality of instructions when detecting that the intervals are not all the same; and performs the memory access in accordance with the single instruction or the plurality of instructions.

20 Claims, 9 Drawing Sheets

ARITHMETIC PROCESSING APPARATUS AND METHOD FOR CONTROLLING ARITHMETIC PROCESSING APPARATUS

CROSS-REFERENCE TO RELATED APPLICATION

This application is based upon and claims the benefit of priority of the prior Japanese Patent Application No. 2017-096400, filed on May 15, 2017, the entire contents of which are incorporated herein by reference.

FIELD

The embodiment discussed herein is related to an arithmetic processing apparatus and a method for controlling the arithmetic processing apparatus.

BACKGROUND

Arithmetic processing units exchange data with a data memory.

Japanese Laid-open Patent Publication No. 2012-128559 or No. 2006-215799 discusses the related technology.

SUMMARY

According to an aspect of the embodiments, an arithmetic processing apparatus includes: a memory; and a processor coupled to the memory, wherein the processor: detects whether intervals of a plurality of addresses to be accessed by a memory access instruction that performs memory access to the plurality of addresses by a single instruction are all the same; decodes the memory access instruction as the single instruction when detecting that the intervals are all the same; decodes the memory access instruction as a plurality of instructions when detecting that the intervals are not all the same; and performs the memory access in accordance with the single instruction or the plurality of instructions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, an arithmetic processing unit has a plurality of vector pipelines used to exchange data with a data memory having a plurality of simultaneously accessible memory blocks. The arithmetic processing unit performs stride access to the data memory based on a first parameter that determines the data size of a basic pattern and a second parameter that determines the number of effective data in the basic pattern.

For example, a memory controller controls the operation performed by a memory based on an access from a processor. A history storage circuit stores history information regarding discontinuous access in which the addresses of data accessed by the processor are discontinuous. The discontinuous access prediction circuit predicts discontinuous access based on history information. The address output circuit outputs the read addresses of data to be read from the memory based on the prediction for the discontinuous access. The data storage circuit stores the data read from the memory based on the read addresses.

The stride access time of the arithmetic processing unit is longer than the non-stride access time.

For example, an arithmetic processing unit may be provided that is capable of accessing a plurality of memory addresses at high speed by executing a single memory-access instruction.

Figure 1:
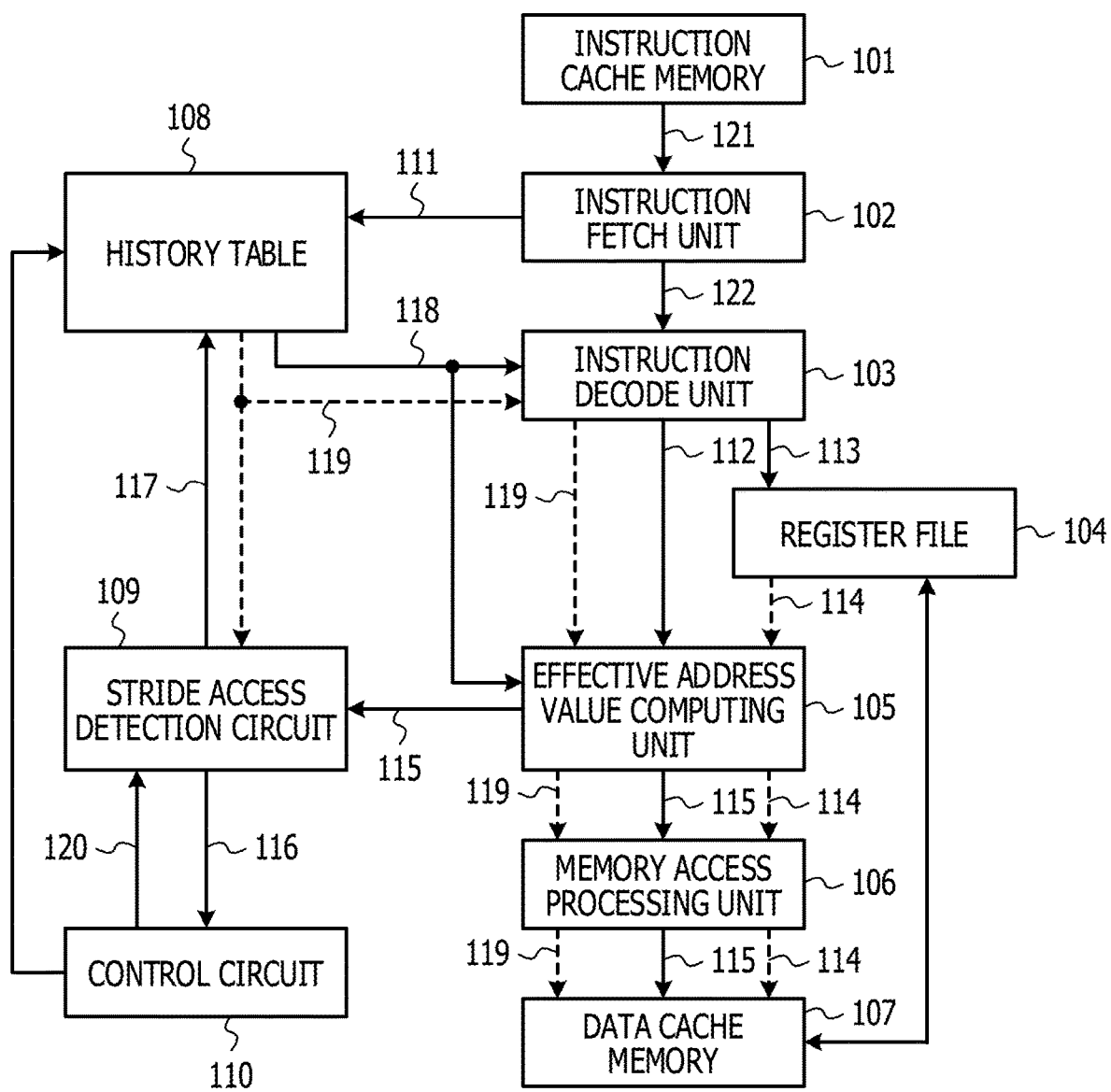
FIG. 1 illustrates an example of an arithmetic processing unit.

FIG. 1 illustrates an example of the arithmetic processing unit. The arithmetic processing unit has an instruction cache memory 101, an instruction fetch unit 102, an instruction decode unit 103, a register file 104, an effective address value computing unit 105, a memory access processing unit 106, and a data cache memory 107. The arithmetic processing unit further includes a history table 108, a stride access detection circuit 109, and a control circuit 110. The control circuit 110 controls each of the units in the arithmetic processing unit.

Figure 8:
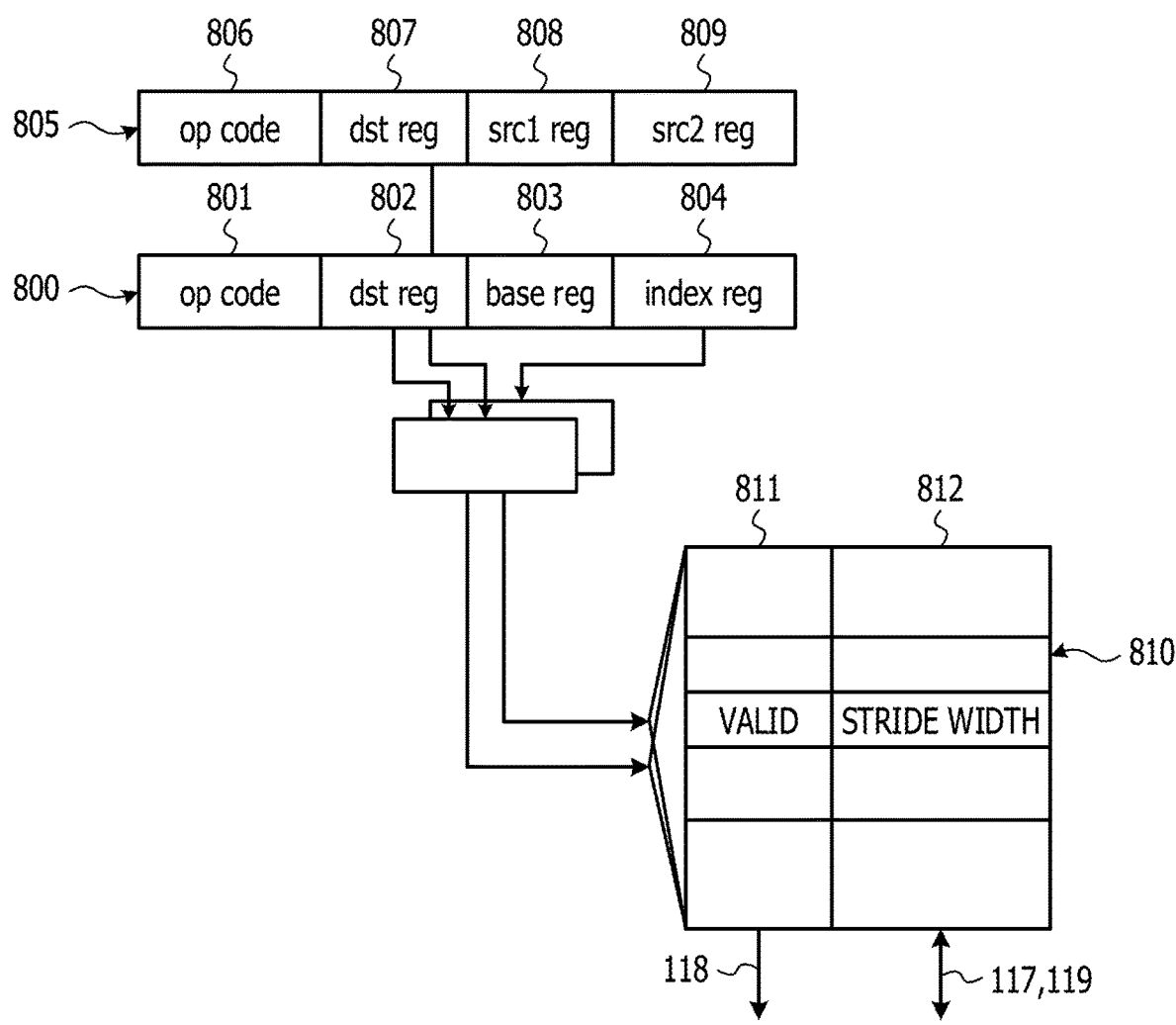
FIG. 8 illustrates an example of a history table.

The instruction cache memory 101 stores instructions including an indirect access instruction 800 and an operation instruction 805 illustrated in FIG. 8. The indirect access instruction 800 is a load instruction or a store instruction. The indirect access instruction 800 has an operation code 801, a destination register number 802, a base register number 803, and an index register number 804. The operation code 801 indicates the type of the instruction. Each of the destination register number 802, the base register number 803, and the index register number 804 identifies one of a plurality of registers in the register file 104. The base register number 803 and the index register number 804 are the register numbers of the registers that contain the address to be accessed. The destination register number 802 is the register number of a register to which the loaded data is written or the register number of a register that contains the data to be stored. The operation instruction 805 is an instruction to perform an arithmetic operation, a logical operation, and data transfer between registers. The operation instruction 805 has an operation code 806, a destination register number 807, a first source operand register number 808, and a second source operand register number 809. The operation code 806 indicates the type of instruction to be executed. Each of the destination register number 807, the first source operand register number 808, and the second source operand register number 809 is the register number of one of a plurality of registers in the register file 104. The first source operand register number 808 and the second source operand register number 809 are the register numbers of registers that contain data to be input to the computing unit. The destination register number 807 is the register number of a register to which the computing result is to be written.

The instruction fetch unit 102 fetches the instruction 121 stored in the instruction cache memory 101, outputs a fetched instruction 122 to the instruction decode unit 103, and outputs an address 111 of the fetched instruction to the history table 108. The instruction decode unit 103 receives a hit signal 118 and a stride width 119, decodes the instruction 122, outputs the stride width 119 and an operation code 112 to the effective address value computing unit 105, and outputs register numbers 113 to the register file 104. The hit signal 118 and the stride width 119 are described in detail below. The operation code 112 corresponds to the operation code 801 in FIG. 8. The register numbers 113 correspond to the destination register number 802, the base register number 803, and the index register number 804.

Figure 7:
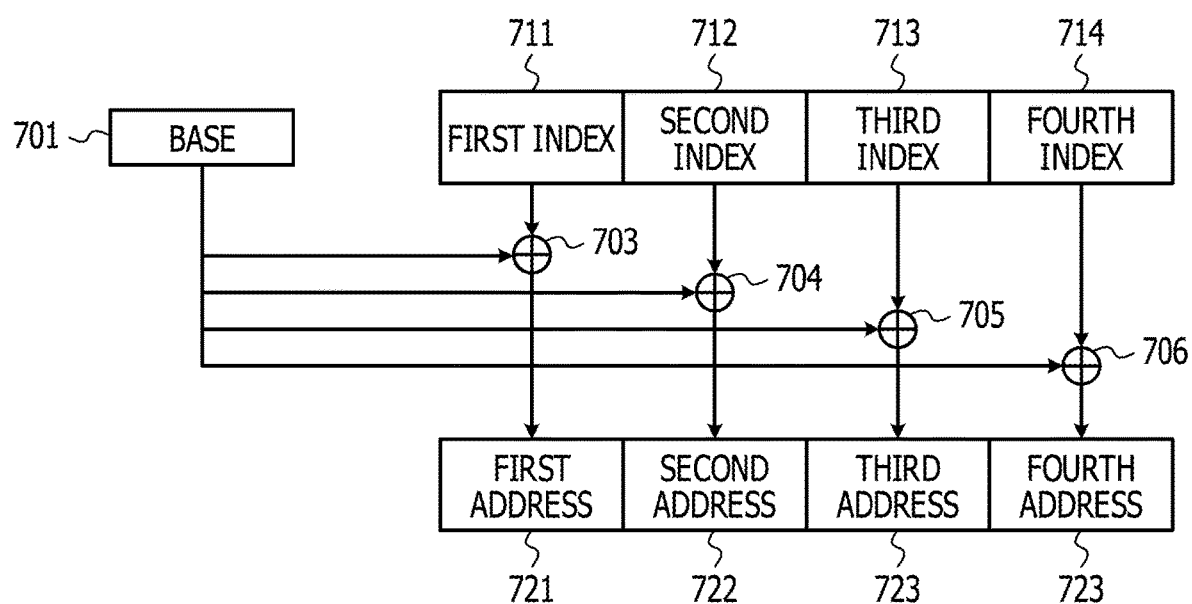
FIG. 7 illustrates an example of address calculation.

The register file 104 includes a plurality of registers and outputs, to the effective address value computing unit 105, an operand 114 corresponding to the register numbers 113. For example, as illustrated in FIG. 7, in addition to outputting the destination register number 802, the register file 104 outputs, to the effective address value computing unit 105, a base address 701 contained in a scalar register indicated by the base register number 803 and first to fourth index addresses 711 to 714 contained in the vector register indicated by the index register number 804. The term "scalar register" refers to a register that contains one value. The term "vector register" refers to a register that contains a plurality of values.

The effective address value computing unit 105 receives the stride width 119, the operation code 112, and the operand 114 and outputs, to the memory access processing unit 106, the stride width 119, effective addresses 115, and the operand 114. As illustrated in FIG. 7, the effective address value computing unit 105 has adders 703 to 706. The adder 703 sums the base address 701 and the first index address 711 and outputs a first effective address 721. The adder 704 sums the base address 701 and a second index address 712 and outputs a second effective address 722. The adder 705 sums the base address 701 and a third index address 713 and outputs a third effective address 723. The adder 706 sums the base address 701 and a fourth index address 714 and outputs a fourth effective address 724. The effective address value computing unit 105 outputs the first to fourth effective addresses 721 to 724 as the effective addresses 115 to the memory access processing unit 106 and the stride access detection circuit 109.

The memory access processing unit 106 receives the stride width 119, the effective addresses 115, the operand 114, and the operation code 112 and loads data from the data cache memory 107 or stores data in the data cache memory 107.

Figure 2:
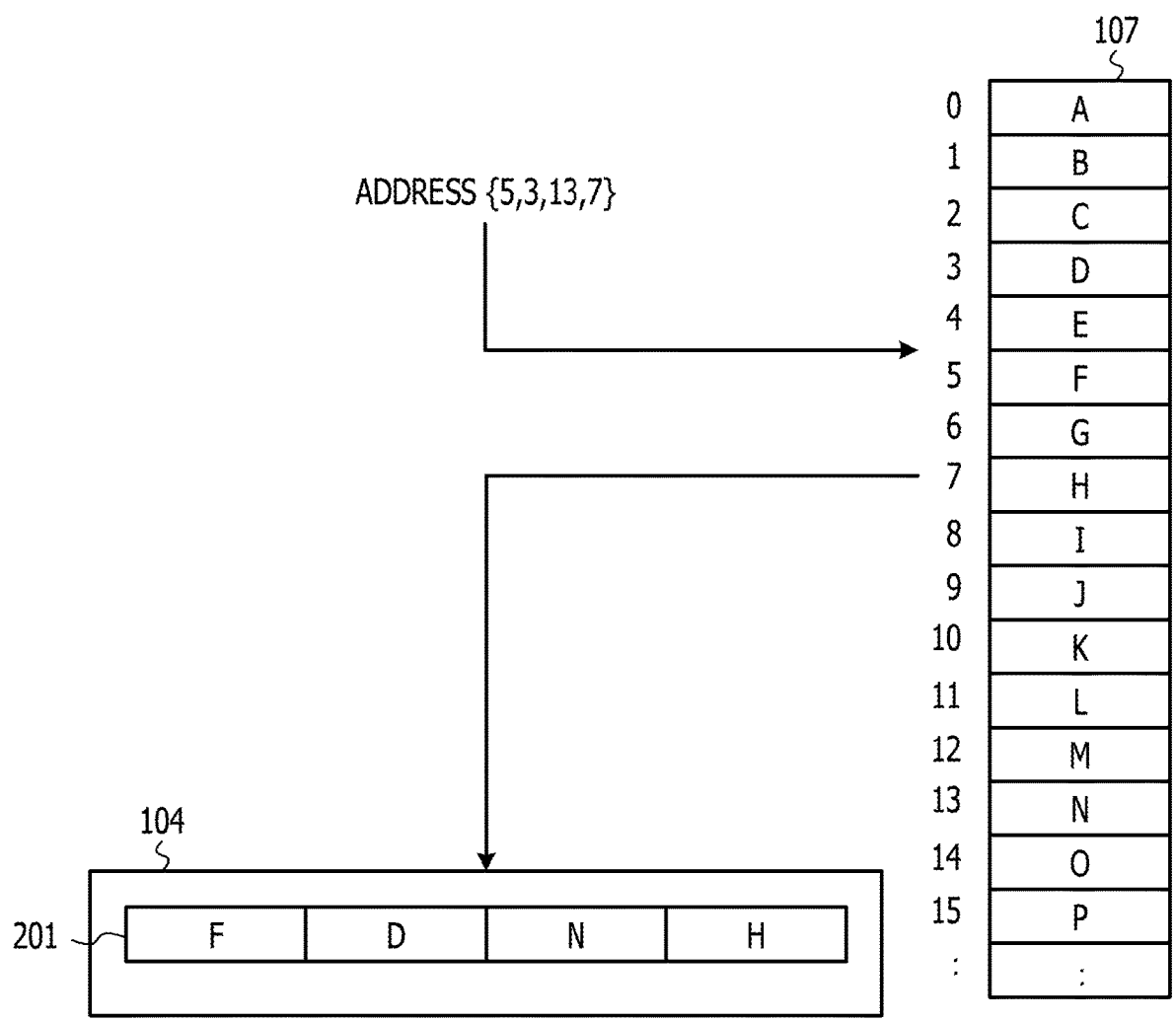
FIG. 2 illustrates an example of a loading process performed on a data cache memory by a memory access processing unit.

FIG. 2 illustrates an example of a loading process performed by the memory access processing unit to load data from the data cache memory. For example, the first effective address 721 is "5", the second effective address 722 is "3", the third effective address 723 is "13", and the fourth effective address 724 is "7". The register file 104 includes a vector register 201 indicated by the destination register number 802.

When the operation code 112 indicates a load instruction, the memory access processing unit 106 loads data F at address 5 of the data cache memory 107, writes the data F to a first area of the vector register 201, loads data D at address 3 of the data cache memory 107, writes the data D to a second area of the vector register 201, loads data N at address 13 of the data cache memory 107 and writes the data N to a third area of the vector register 201, loads data H at address 7 of the data cache memory 107, and writes the data H to a fourth area of the vector register 201.

When the operation code 112 indicates a store instruction, the memory access processing unit 106 stores the data F contained in the first area of the vector register 201 into the data cache memory 107 at address 5, stores the data D contained in the second area of the vector register 201 into the data cache memory 107 at address 3, stores the data N contained in the third area of the vector register 201 into the data cache memory 107 at address 13, and stores the data H contained in the fourth area of the vector register 201 into the data cache memory 107 at address 7.

The arithmetic processing unit can perform a single instruction multiple data streams (SIMD) arithmetic operation in order to utilize the data-level parallelism. In addition, the arithmetic processing unit can execute the indirect access instruction 800 in order to increase the rate at which the SIMD operation is applicable. As described above, the indirect access instruction 800 is an instruction that, when executed, accesses a memory at a plurality of effective addresses 721 to 724 by itself. Furthermore, the indirect access instruction 800 is an instruction that can perform a plurality of independent memory accesses by a single instruction.

For example, the instruction decode unit 103 decomposes one indirect access instruction into a plurality of scalar access instructions and decodes the scalar access instructions, and the memory access processing unit 106 executes the plurality of scalar access instructions. A scalar access instruction is an instruction that performs memory access at one address by one instruction. For example, in the case illustrated in FIG. 2, the instruction decode unit 103 decomposes an indirect access instruction for accessing a plurality of addresses (address 5, address 3, address 13 and address 7) into a scalar access instruction for accessing address 5, a scalar access instruction for accessing address 3, a scalar access instruction for accessing address 13, and a scalar access instruction for accessing address 7 and decodes the scalar access instructions. That is, the instruction decode unit 103 considers one indirect access instruction as a plurality of scalar access instructions and decodes the scalar access instructions. The memory access processing unit 106 sequentially executes the four scalar access instructions. However, this execution may reduce the memory access speed.

The stride access detection circuit 109 is an address detection unit which receives the effective addresses 115 from the effective address value computing unit 105 and detects whether the intervals between any two of the plurality of effective addresses 115 of the indirect access instruction are all the same. In addition, the stride access detection circuit 109 verifies whether the interval of the detected effective addresses 115 is the same as the stride width 119 output from the history table 108 by comparison.

Figure 3:
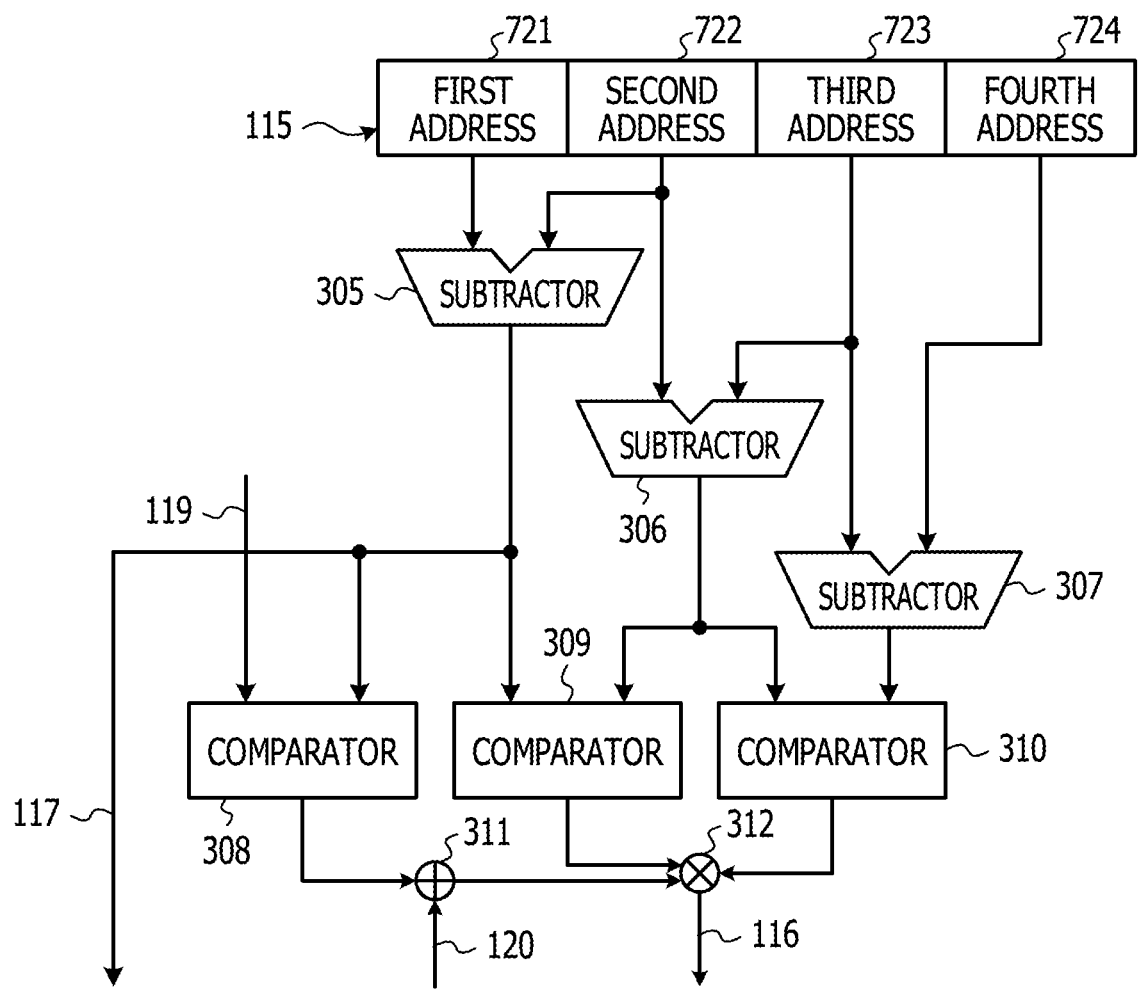
FIG. 3 illustrates an example of a stride access detection circuit.

FIG. 3 illustrates an example of a stride access detection circuit. The stride access detection circuit 109 includes subtractors 305, 306, and 307, comparators 308, 309, and 310, a logical sum circuit (an OR circuit) 311, and a logical product circuit (an AND circuit) 312. As described above, the effective addresses 115 include the first effective address 721, the second effective address 722, the third effective address 723, and the fourth effective address 724.

The subtractor 305 subtracts the first effective address 721 from the second effective address 722 and outputs the subtraction result as the interval between the first effective address 721 and the second effective address 722. The subtractor 306 subtracts the second effective address 722 from the third effective address 723 and outputs the subtraction result as the interval between the second effective address 722 and the third effective address 723. The subtractor 307 subtracts the third effective address 723 from the fourth effective address 724 and outputs the subtraction result as the interval between the third effective address 723 and the fourth effective address 724.

The comparator 308 compares the output value of the subtractor 305 with the stride width 119. If the output value of the subtractor 305 is the same as the stride width 119, the comparator 308 outputs a value of "1". However, if the output value of the subtractor 305 is not the same as the stride width 119, the comparator 308 outputs a value of "0". The comparator 309 compares the output value of the subtractor 305 with the output value of the subtractor 306. If the output value of the subtractor 305 is the same as the output value of the subtractor 306, the comparator 308 outputs a value of "1". However, the output value of the subtractor 305 is not the same as the output value of the subtractor 306, the comparator 308 outputs a value of "0". The comparator 310 compares the output value of the subtractor 306 with the output value of the subtractor 307. If the output value of the subtractor 306 is the same as the output value of the subtractor 307, the comparator 310 outputs a value of "1". However, if the output value of the subtractor 306 is not the same as the output value of the subtractor 307, the comparator 310 outputs a value of "0".

The logical sum circuit 311 outputs the logical sum of the output value of the comparator 308 and a control signal 120. If the control signal 120 is "1", the output of the logical sum circuit 311 is "1" at all times regardless of the result of the comparator 308. If the control signal 120 is 0, the output of the logical sum circuit 311 has the same value as the output of the comparator 308. That is, if the output value of the comparator 308 is "1", the logical sum circuit 311 outputs "1". However, if the output value of the comparator 308 is "0", the logical sum circuit 311 outputs "0".

If the control signal 120 is "1", the logical product circuit 312 outputs the logical sum value of the output values of the comparators 309 and 3010 as a stride detection signal 116. The subtractor 305 outputs the subtraction result as a stride width 117. If the intervals between any adjacent two of the first to fourth effective addresses 721 to 724 are all the same, the stride detection signal 116 is set to "1", and the intervals between any adjacent two of the first to fourth effective addresses 721 to 724 at this time are the stride width 117. If the intervals between any adjacent two of the first to fourth effective addresses 721 to 724 are not the same, the stride detection signal 116 is set to "0". Hereinafter, the indirect access instruction when the stride detection signal 116 is "1" is referred to as a "stride access instruction". The stride access detection circuit 109 receives the effective addresses 115, outputs the stride detection signal 116 to the control circuit 110, and outputs the stride width 117 to the history table 108. If the control signal 120 is "0", the logical product circuit 312 outputs the logical product of the output values of the comparator 308, the comparator 309, and the comparator 310 as a stride detection signal 116. If the intervals between any adjacent two of the first to fourth effective addresses 721 to 724 are all the same and are the same as the value of the stride width 119, a stride detection signal 116 of "1" is output. However, if the intervals between any adjacent two of the first to fourth effective addresses 721 to 724 are not the same or are not the same as the value of the stride width 119, the stride detection signal 116 is "0". In this manner, the stride access detection circuit 109 can change its operation by using the control signal 120. The effective addresses are not limited to the four effective addresses 721 to 724, and any number of effective addresses may be used.

In FIG. 1, when the stride detection signal 116 is "1", the control circuit 110 registers a stride width 117 in the history table 108 for each of instruction addresses 111.

Figure 4:
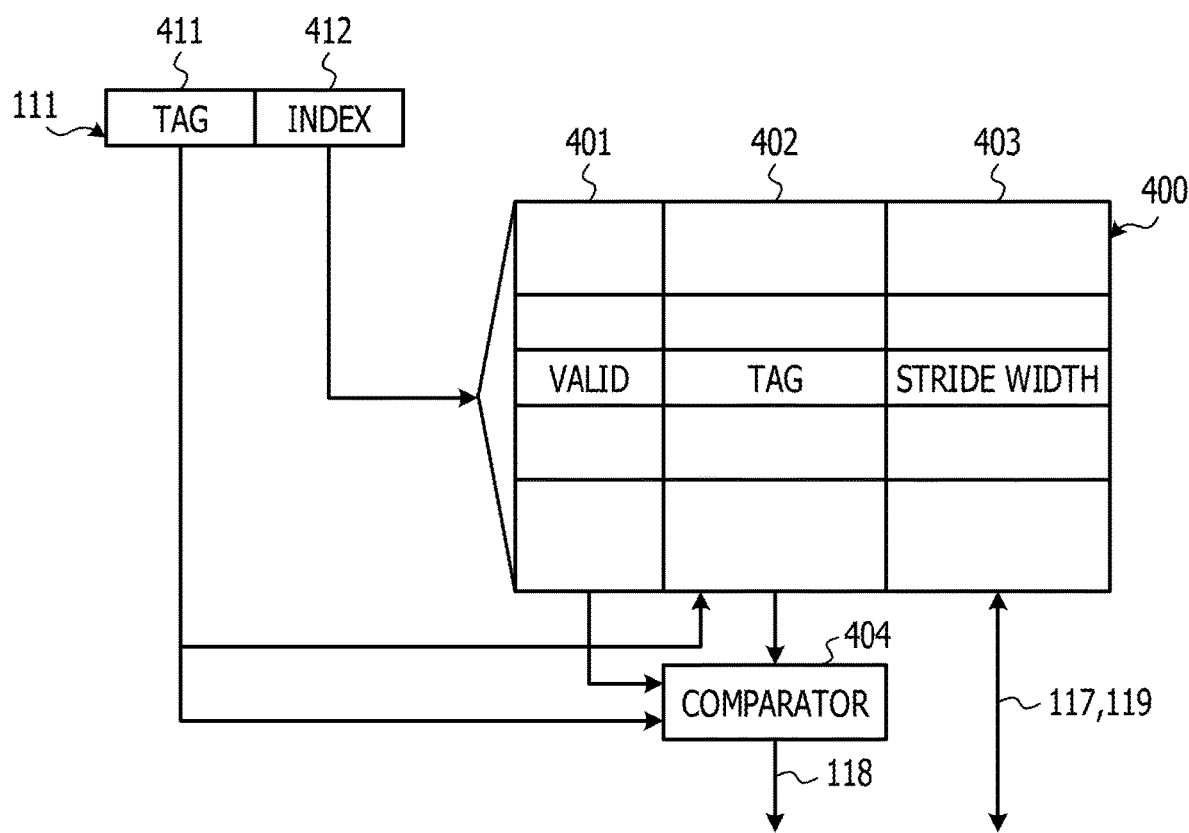
FIG. 4 illustrates an example of a history table.

FIG. 4 illustrates an example of the history table. The history table 108 has an entry section 400 and a comparator 404. The instruction address 111 has a tag address 411 and an index address 412. The tag address 411 is the upper address of the instruction address 111. The index address 412 is the lower address of the instruction address 111.

In performing the registration process with the history table 108, if the stride detection signal 116 is "1", the control circuit 110 writes a valid flag 401 to an entry in the entry section 400 indicated by the index address 412 in order to indicate that the entry is valid, writes the tag address 411 as a tag address 402, and writes the stride width 117 as a stride width 403. That is, for each of the index addresses 412 of the indirect access instruction, the control circuit 110 registers the valid flag 401 which indicates that the intervals between any adjacent two of the plurality of addresses are all the same, the tag address 402, and the stride width 403 in the entry section 400 of the history table 108.

In searching the history table 108, if the history table 108 receives the instruction address 111, the control circuit 110 reads the valid flag 401, the tag address 402, and the stride width 403 stored in the entry in the entry section 400 indicated by the index address 412. If the read valid flag 401 indicates the validity and if the read tag address 402 and tag address 411 are the same, the comparator 404 outputs a hit signal 118 of "1". Otherwise, the comparator 404 outputs a hit signal 118 of "0". In addition, the history table 108 outputs the read stride width 403 as a stride width 119. The history table 108 outputs the hit signal 118 and the stride width 119 to the instruction decode unit 103. The stride width 119 is output to the data cache memory 107 via the instruction decode unit 103, the effective address value computing unit 105, and the memory access processing unit 106.

While the history table 108 has been described with reference to a direct map structure as an example, the structure may be a set associative structure or a full associative structure.

When the indirect access instruction is a stride access instruction, the memory access processing unit 106 can access the data cache memory 107 at high speed.

Figure 5:
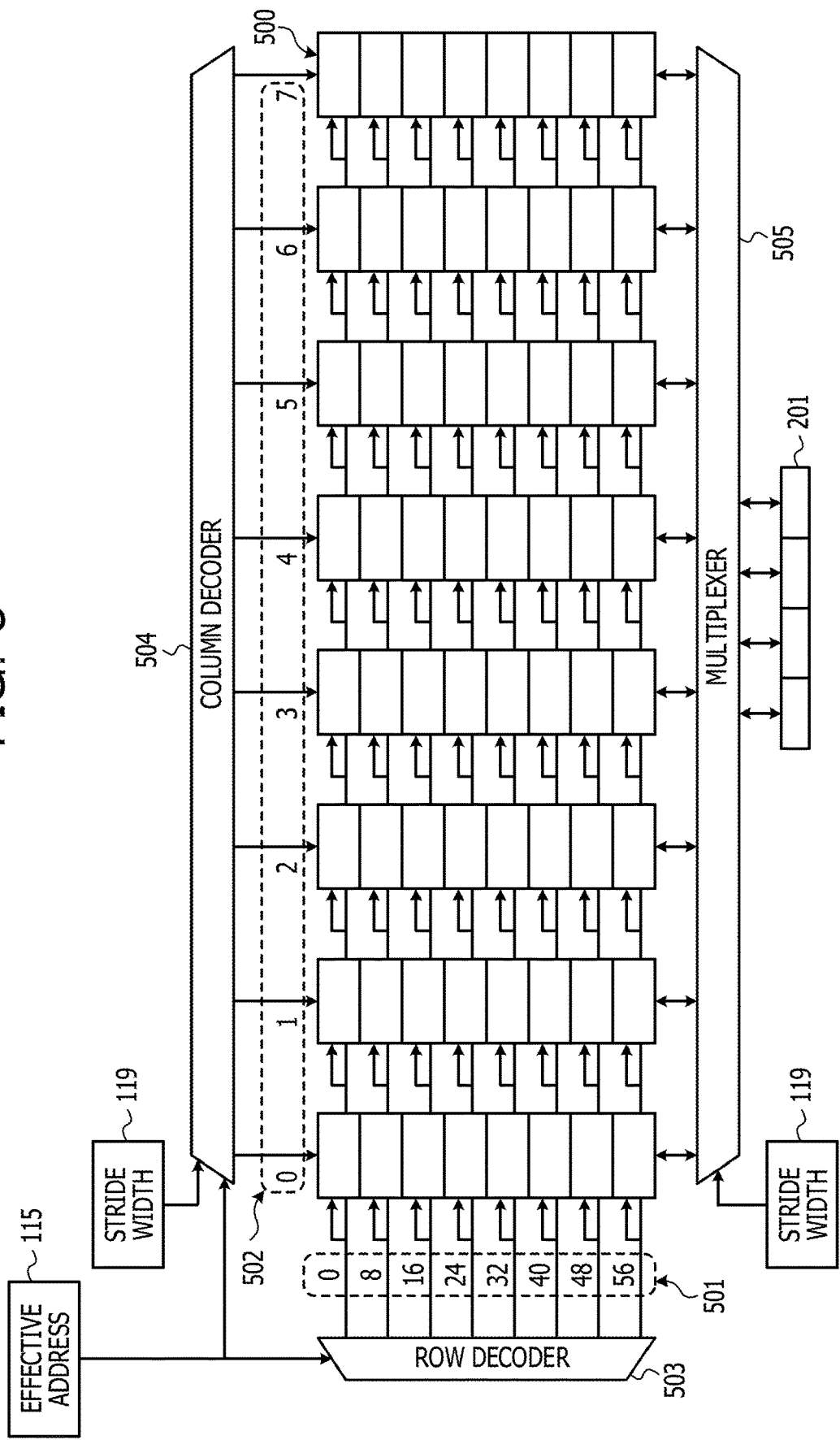
FIG. 5 illustrates an example of the data cache memory.

FIG. 5 illustrates an example of a data cache memory. The data cache memory 107 includes eight memory banks 500, a row decoder 503, a column decoder 504, and a multiplexer 505.

Each of the plurality of memory banks 500 stores the data of one of the addresses. The column decoder 504 functions as a selection unit which outputs a lower address selection signal 502 in accordance with the effective address 115 and the stride width 119 and selects the memory bank 500. The row decoder 503 functions as a selection unit which outputs an upper address selection signal 501 in accordance with the effective address 115 and selects an address in the selected memory bank 500. The multiplexer 505 loads or stores data based on the address selected by the column decoder 504 and the row decoder 503 in accordance with the stride width 119.

Assume that the effective addresses 115 of the stride access instruction (the load instruction) indicate address 0, address 1, address 2, and address 3. This stride access instruction is an access instruction to access four consecutive addresses. The start address of the effective addresses 115 is address 0, and the stride width 119 is "1". The row decoder 503 outputs an upper address selection signal 501 of "0", and the column decoder 504 outputs lower address selection signals 502 of "0", "1", "2", and "3". For the first row, the memory bank 500 loads the data stored at addresses 0 to 3, which represent the first to fourth columns, and outputs the data to the multiplexer 505. The multiplexer 505 outputs the data at addresses 0 to 3. Thereafter, the memory access processing unit 106 writes the data at addresses 0 to 3 into the vector register 201.

In the case of a store instruction, the multiplexer 505 outputs the four pieces of data in the vector register 201 to the memory banks 500 of the first to fourth columns. In the first row, the memory bank 500 stores the four pieces of data at addresses 0 to 3, which represent the first to fourth columns.

Subsequently, assume that the effective addresses 115 of the stride access instruction (the load instruction) are address 8, address 10, address 12, and address 14. The start address of the effective address 115 is address 8, and the stride width 119 is 2. The row decoder 503 outputs an upper address selection signal 501 of "8", and the column decoder 504 outputs lower address selection signals 502 of 0, 2, 4, and 6. For the second row, the memory bank 500 loads the data at addresses 8, 10, 12, and 14 stored in the first, third, fifth and seventh columns and outputs the data to the multiplexer 505. The multiplexer 505 outputs the data at addresses 8, 10, 12, and 14. Thereafter, the memory access processing unit 106 writes the data at addresses 8, 10, 12, and 14 into the vector register 201.

In the case of a store instruction, the multiplexer 505 outputs the four pieces of data in the vector register 201 to the memory banks 500 of the first, third, fifth, and seventh columns. In the second row, the memory bank 500 stores four pieces of data at addresses 8, 10, 12 and 14 which represent the first, third, fifth and seventh columns.

For simplicity of description, the configuration of the memory bank 500 in the case of the stride width 119 of 2 or less is illustrated in FIG. 5. For example, by increasing the number of memory banks, the configuration of the memory bank 500 for a stride width 119 of 3 or more may be provided.

As described above, in the case of a stride access instruction, the data cache memory 107 can access a plurality of effective addresses 115 in parallel under the control of the memory access processing unit 106. As a result, when the indirect access instruction is a stride access instruction, the memory access processing unit 106 can the data cache memory 107 at high speed.

Figure 6:
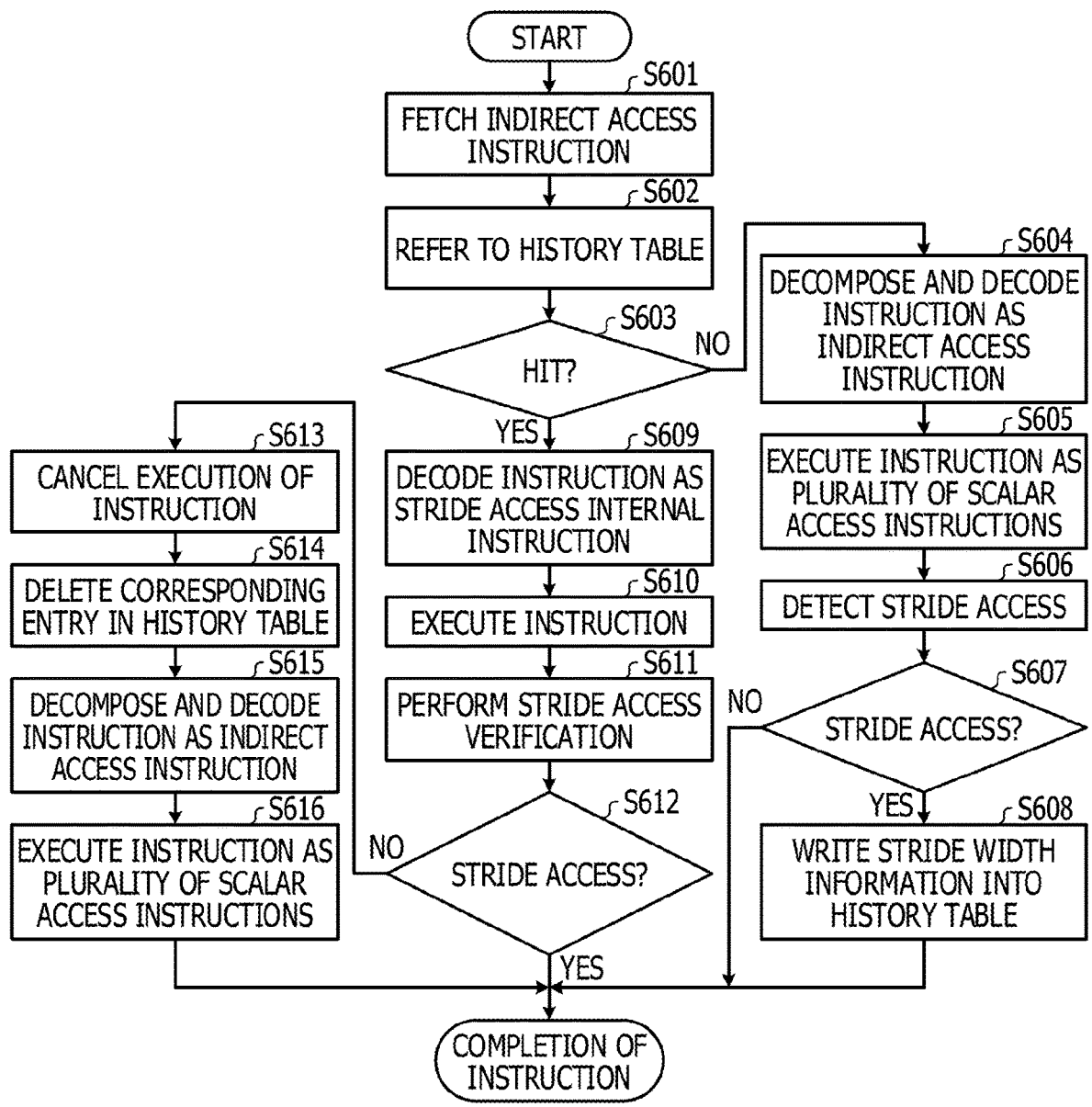
FIG. 6 illustrates an example of a method for controlling the arithmetic processing unit.

FIG. 6 is a flowchart illustrating a method for controlling the arithmetic processing unit according to the first embodiment. In step S601, the instruction fetch unit 102 fetches an indirect access instruction 121 stored in the instruction cache memory 101, outputs the fetched indirect access instruction 122 to the instruction decode unit 103, and outputs the address 111 of the fetched access instruction 121 to the history table 108.

In step S602, under the control of the control circuit 110, the history table 108 outputs the hit signal 118 and the stride width 119 in accordance with the address 111, as illustrated in FIG. 4. The history table 108 outputs a hit signal 118 of "1" if the read valid flag 401 indicates the validity and if the read tag address 402 and the tag address 411 are the same. Otherwise, the history table 108 outputs a hit signal 118 of "0". A hit signal 118 of "1" indicates that the indirect access instruction corresponding to the address 111 is a stride access instruction and that the intervals between any adjacent two of the plurality of addresses corresponding to the indirect access instruction are all the same. A hit signal 118 of "0" indicates that the indirect access instruction corresponding to the address 111 is not a stride access instruction and, thus, the intervals between any adjacent ones of the plurality of addresses corresponding to the indirect access instruction are not the same or the indirect access instruction corresponding to the address 111 was fetched for the first time.

In step S603, the instruction decode unit 103 determines whether the hit signal 118 is "1" or "0". Upon determining that the hit signal 118 is "1", the instruction decode unit 103 postulates that the indirect access instruction is a stride access instruction, and the processing proceeds to step S609. However, upon determining that the hit signal 118 is "0", the instruction decode unit 103 postulates that the indirect access instruction is not a stride access instruction, and the processing proceeds to step S604.

In step S604, the instruction decode unit 103 decomposes the indirect access instruction into a plurality of scalar access instructions and decodes the scalar access instructions. For example, as illustrated in FIG. 2, when the indirect access instruction has the following addresses: address 5, address 3, address 13 and address 7, the instruction fetch unit 102 decomposes the indirect access instruction into a scholar scalar access instructions having address 5, a scholar scalar access instructions having address 3, a scalar access instruction having address 13, and a scalar access instruction having address 7 and decodes the scholar scalar access instructions. For example, the instruction decode unit 103 considers one indirect access instruction as a plurality of scalar access instructions and decodes the indirect access instruction. The instruction decode unit 103 outputs the operation code 112 and the register number 113. The register file 104 outputs the operand 114 to the effective address value computing unit 105 in accordance with the register number 113.

In step S605, the effective address value computing unit 105 outputs the effective addresses 115 and the operand 114 in accordance with the operation code 112 and the operand 114. The memory access processing unit 106 sequentially performs memory accesses to the data cache memory 107 in accordance with the operation code 112, the effective addresses 115, and the operand 114, where each of the memory accesses corresponds to one of the plurality of scalar access instructions. If the plurality of scalar access instructions are load instructions, the memory access processing unit 106 loads data from the data cache memory 107 and writes the loaded data into the registers in the register file 104. If the plurality of scalar access instructions are store instructions, the memory access processing unit 106 stores, in the data cache memory 107, the data contained in the registers in the register file 104.

In step S606, the control circuit 110 sets the control signal 120 to "1" and outputs the control signal 120 to the stride access detection circuit 109. As illustrated in FIG. 3, the stride access detection circuit 109 detects whether the intervals between any adjacent two of the plurality of effective addresses 115 are all the same and outputs a stride detection signal 116 and a stride width 117. If the intervals between any adjacent two of the plurality of effective addresses 115 are all the same, the stride detection signal 116 is set to "1". However, if the intervals between any adjacent two of the plurality of effective addresses 115 are not the same, the stride detection signal 116 is set to "0".

In step S607, the control circuit 110 determines whether the stride detection signal 116 is "1" or "0". If the control circuit 110 determines that the stride detection signal 116 is "1", the processing performed by the control circuit 110 proceeds to step S608. However, if the control circuit 110 determines that the stride detection signal 116 is "0", the processing performed by the control circuit 110 is completed. Thereafter, the processing is repeated for the next instruction.

In step S608, as illustrated in FIG. 4, the control circuit 110 writes, to the history table 108, a valid flag 401 indicating the validity of the entry in the entry section 400 indicated by the index address 412, writes the tag address 411 as the tag address 402, and writes the stride width 117 as the stride width 403. Thereafter, the control circuit 110 completes the processing and repeats the processing for the next instruction.

Steps S609 to S612 are performed when the indirect access instruction is postulated as a stride access instruction. In step S609, the instruction decode unit 103 considers the indirect access instruction (the stride access instruction) as a single instruction and decodes the indirect access instruction into an internal instruction. Thereafter, the instruction decode unit 103 outputs the stride width 119, the operation code 112, and the register number 113. The register file 104 outputs the operand 114 to the effective address value computing unit 105 in accordance with the register number 113.

In step S610, the effective address value computing unit 105 outputs the stride width 119, the effective addresses 115, and the operand 114 in accordance with the stride width 119, the operation code 112, and the operand 114. The memory access processing unit 106 performs access to the data cache memory 107 based on a stride access instruction in accordance with the stride width 119, the operation code 112, the effective addresses 115, and the operand 114. If the stride access instruction is a load instruction, the memory access processing unit 106 loads data at a plurality of addresses of the data cache memory 107 in parallel and writes the loaded data to the registers in the register file 104 in parallel. If the stride access instruction is a store instruction, the memory access processing unit 106 stores, into the data cache memory 107 at a plurality of addresses, the data contained in the registers in the register file 104 in parallel.

In step S611, the control circuit 110 sets the control signal 120 to "0" and outputs the control signal 120 to the stride access detection circuit 109. As illustrated in FIG. 3, to verify whether the postulate is true or false, the stride access detection circuit 109 determines whether the intervals between any adjacent two of the plurality of effective addresses 115 are all the same and the intervals between any adjacent two of the plurality of effective addresses 115 are the same as the stride width 119 output from the history table 108. Thereafter, the stride access detection circuit 109 outputs the stride detection signal 116. If the intervals between any adjacent two of the plurality of effective addresses 115 are all the same and the intervals between any adjacent two of the plurality of effective addresses 115 are the same as the stride width 119 output from the history table 108, the stride detection signal 116 is set to "1". However, if the intervals between any adjacent two of the plurality of effective addresses 115 are not the same or if the intervals between any adjacent two of the plurality of effective addresses 115 are not the same as the stride width 119 output from the history table 108, the stride detection signal 116 is set to "0". For example, the following case may occur. That is, the intervals between any adjacent two of the first to fourth effective addresses 721 to 724 are all the same at the time of the registration process with the history table 108. However, thereafter, first to fourth index addresses 711 to 714 contained in the vector register indicated by the index register number 804 are rewritten. In this case, the intervals of any adjacent two of the first to fourth addresses 721 to 724 are not the same, and the stride detection signal 116 is set to "0".

In step S612, the control circuit 110 determines whether the stride detection signal 116 is "1" or "0". If the control circuit 110 determines that the stride detection signal 116 is "0", the processing performed by the control circuit 110 proceeds to step S613 because incorrect postulation was made. However, if the control circuit 110 determines that the stride detection signal 116 is "1", correct postulation was made. Accordingly, the control circuit 110 completes the processing and, thereafter, repeats the processing for the next instruction.

In step S613, since incorrect postulation was made, the control circuit 110 performs, on each of the units of the arithmetic processing unit, a process to cancel the memory access processing for the above-described stride access instruction.

In step S614, since incorrect postulation was made, the control circuit 110 deletes the entry corresponding to the above-described address 111 in the history table 108.

In step S615, the instruction decode unit 103 decomposes the indirect access instruction into a plurality of scalar access instructions and decodes the scalar access instructions. For example, the instruction decode unit 103 considers one indirect access instruction as a plurality of scalar access instructions and decodes the indirect access instruction. Thereafter, the instruction decode unit 103 outputs the operation code 112 and the register number 113. The register file 104 outputs the operand 114 to the effective address value computing unit 105 in accordance with the register number 113.

Subsequently, in step S616, the effective address value computing unit 105 outputs the effective addresses 115 and the operand 114 in accordance with the operation code 112 and the operand 114. Like step S605, the memory access processing unit 106 sequentially performs memory accesses to the data cache memory 107 in accordance with the operation code 112, the effective addresses 115, and the operand 114, where each of the memory accesses corresponds to one of the plurality of scalar access instructions. Thereafter, the control circuit 110 completes the processing and, subsequently, repeats the processing for the next instruction.

As described above, by using the history table 108, the arithmetic processing unit can postulate whether the indirect access instruction is the stride access instruction before decoding the instruction. As a result, if the indirect access instruction is a stride access instruction, the instruction decode unit 103 decodes the stride access instruction as one instruction. In contrast, if the indirect access instruction is not a stride access instruction, the instruction decode unit 103 decomposes the indirect access instruction into a plurality of scalar access instructions and decodes the scalar access instructions. That is, if the indirect access instruction is not a stride access instruction, the instruction decode unit 103 considers one indirect access instruction as a plurality of scalar access instructions and decodes the scalar access instructions.

For example, if the indirect access instruction has n addresses, the instruction decode unit 103 decomposes the indirect access instruction into n scalar access instructions and decodes the scalar access instructions. That is, if the indirect access instruction includes n addresses, the instruction decode unit 103 considers one indirect access instruction as n scalar access instructions and decodes the n scalar access instructions. If the indirect access instruction is a stride access instruction, the instruction decode unit 103 considers the stride access instruction as one instruction and decodes the stride access instruction. Consequently, the processing speed can be increased up to maximum of n times. In general, n is 2 to 16. The effect increases with increasing n. If the indirect access instruction is a stride access instruction, the memory access processing unit 106 can access the data cache memory 107 at high speed.

FIG. 8 illustrates an example of a history table. The different between the history table and the history table illustrated in FIG. 4 is described with reference to FIG. 8. As mentioned above, the indirect access instruction 800 has the operation code 801, the destination register number 802, the base register number 803, and the index register number 804. In addition, the operation instruction 805 has the operation code 806, the destination register number 807, the first source operand register number 808, and the second source operand register number 809. Each of the destination register number 802, the base register number 803, the index register number 804, the destination register number 807, the first source operand register number 808, and the second source operand register number 809 is the register number of one of the registers in the register file 104. The base register number 803 and the index register number 804 are the register numbers of the registers that contain the address to be accessed. The first source operand register number 808 and the second source operand register number 809 are the register numbers of registers that contain data to be input for an operation instruction. The destination register number 802 is the register number of the register to which the loaded data is to be written or the number of the register that contains the data to be stored. The destination register number 807 is the register number of the register to which the result of operation is to be written.

The history table 108 has an entry section 810 and receives the destination register number 802 and the index register number 804 in the indirect access instruction 800 fetched by the instruction fetch unit 102. The control circuit 110 registers a valid flag 811 indicating that the intervals of any two adjacent addresses are all the same and a stride width 812 in the entry section 810 of the history table 108 for each of the register numbers in the register file 104.

A method for registering the information in the history table 108 is described below. If the stride detection signal 116 is "1", the control circuit 110 writes a valid flag 811 indicating the validity to an entry in the entry section 810 indicated by the index register number 804 and writes the stride width 117 as the stride width 812.

If an indirect access instruction that is a load instruction is executed, the memory access processing unit 106 writes the loaded data into the register indicated by the destination register number 802. In the case where an operation instruction is executed, the operation result is written into the register indicated by the destination register number 807. As a result, the values in the registers indicated by the destination register number 802 and the destination register number 807 are rewritten. Therefore, the control circuit 110 deletes, from the history table 108, the entries for the destination register number 802 and the destination register number 807. In this manner, the incorrect postulation using the history table 108 can be avoided.

A method for searching the history table 108 is described below. If the history table 108 receives a fetched indirect instruction, the control circuit 110 outputs the valid flag 811 and the stride width 812 stored in an entry of the entry section 810 indicated by the index register number 804 as the hit signal 118 and the stride width 119. The history table 108 outputs a hit signal 118 of "1" if the valid flag 811 indicates the validity. However, the history table 108 outputs a hit signal 118 of "0" if the valid flag 811 indicates the invalidity.

Figure 9:
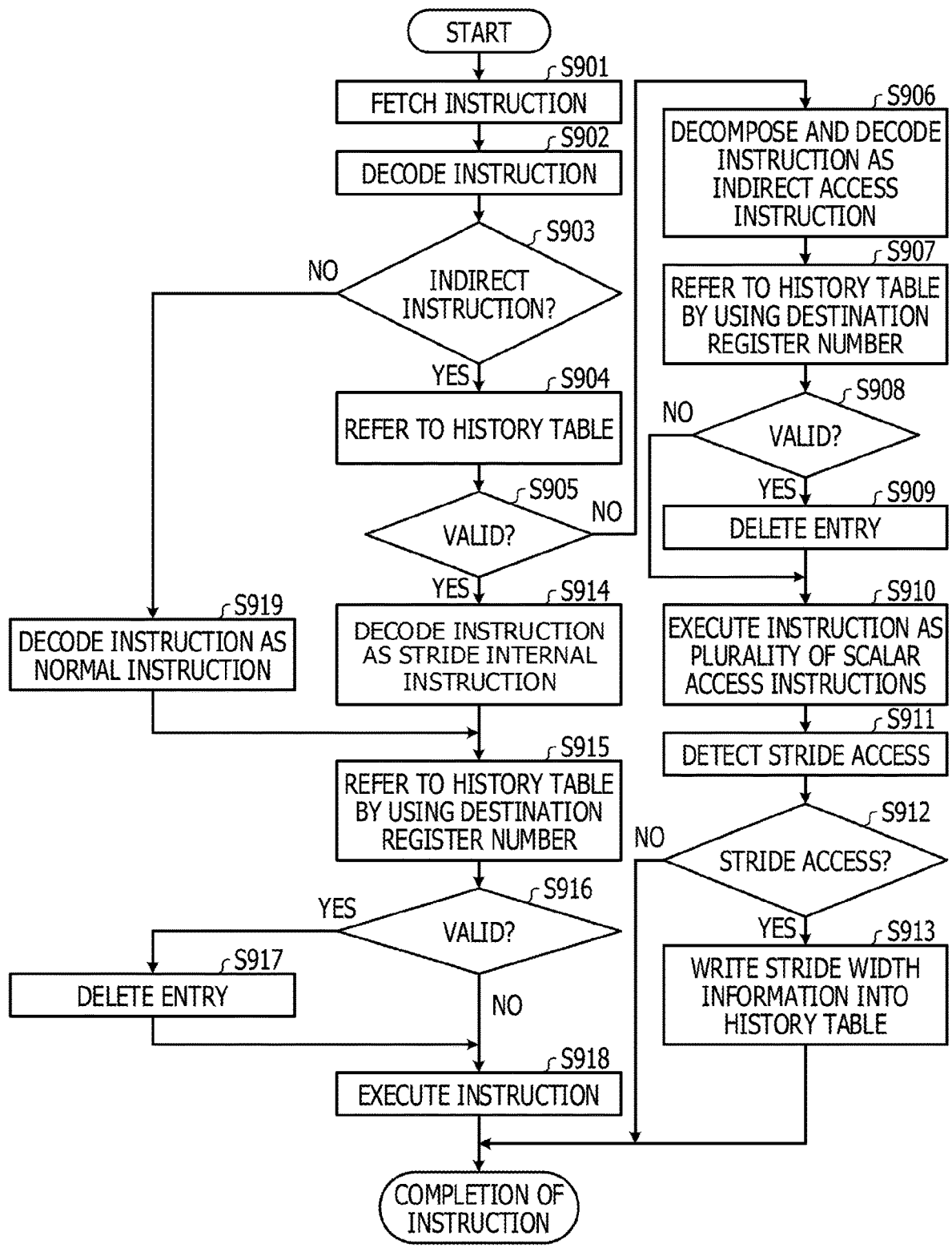
FIG. 9 illustrates an example of a method for controlling the arithmetic processing unit.

FIG. 9 illustrates an example of a method for controlling the arithmetic processing unit. In step S901, the instruction fetch unit 102 fetches the instruction 121 stored in the instruction cache memory 101 and outputs the fetched instruction 122 to the instruction decode unit 103 and the history table 108.

In step S902, the instruction decode unit 103 decodes the instruction 122. Subsequently, in step S903, the instruction decode unit 103 determines whether the instruction 122 is an indirect access instruction or an operation instruction. If the instruction decode unit 103 determines that the instruction 122 is an indirect access instruction, the processing performed by the instruction decode unit 103 proceeds to step S904. However, if the instruction decode unit 103 determines that the instruction 122 is an operation instruction, the processing performed by the instruction decode unit 103 proceeds to step S919.

In step S904, under the control of the control circuit 110, the history table 108 outputs the hit signal 118 and the stride width 119 in accordance with the index register number 804 in the access instruction 122, as illustrated in FIG. 8. The history table 108 outputs a hit signal 118 of "1" if the read valid flag 811 indicates the validity. However, the history table 108 outputs a hit signal 118 of "0" if the read valid flag 811 indicates the invalidity. A hit signal 118 of "1" indicates that the access instruction 122 is a stride access instruction and that the intervals of any adjacent two of the addresses of the indirect access instruction are all the same. In contrast, a hit signal 118 of "0" indicates that the access instruction 122 is not a stride access instruction and the intervals of any adjacent two of the addresses of the indirect access instruction are not the same or that the access instruction 122 is fetched for the first time.

In step S905, the instruction decode unit 103 determines whether the hit signal 118 is "1" or "0". If the instruction decode unit 103 determines that the hit signal 118 is "1", the instruction decode unit 103 postulates that the indirect access instruction is a stride access instruction, and the processing proceeds to step S914. However, if the instruction decode unit 103 determines that the hit signal 118 is "0", the instruction decode unit 103 postulates that the indirect access instruction is not a stride access instruction, and the processing proceeds to step S906.

In step S906, the instruction decode unit 103 decomposes one indirect access instruction into a plurality of scalar access instructions and decodes the scalar access instructions. That is, the instruction decode unit 103 considers one indirect access instruction as a plurality of scalar access instructions and decodes the scalar access instructions. Thereafter, the instruction decode unit 103 outputs the operation code 112 and the register number 113. The register file 104 outputs the operand 114 to the effective address value computing unit 105 in accordance with the register number 113.

In step S907, the history table 108 outputs the hit signal 118 and the stride width 119 in accordance with the destination register number 802 under the control of the control circuit 110, as illustrated in FIG. 8.

In step S908, the control circuit 110 determines whether the hit signal 118 is "1" or "0". If the control circuit 110 determines that the hit signal 118 is "1", the processing performed by the control circuit 110 proceeds to step S909. However, if the hit signal 118 is 0, the processing proceeds to step S910.

In step S909, the control circuit 110 deletes, from the history table 108, the entry corresponding to the destination register number 802, and the processing proceeds the process to step S910.

In step S910, the effective address value computing unit 105 outputs the effective addresses 115 and the operand 114 in accordance with the operation code 112 and the operand 114. Like step S605 illustrated in FIG. 6, the memory access processing unit 106 sequentially performs memory accesses to the data cache memory 107 in accordance with the operation code 112, the effective addresses 115, and the operand 114, where each of the memory accesses corresponds to one of the plurality of scalar access instructions.

In step S911, as illustrated in FIG. 3, the stride access detection circuit 109 detects whether the intervals of any adjacent two of the plurality of effective addresses 115 are all the same and outputs the stride detection signal 116 and the stride width 117. If the intervals of any adjacent two of the plurality of effective addresses 115 are all the same, the stride detection signal 116 is set to "1". However, if the intervals of any adjacent two of the plurality of effective addresses 115 are not the same, the stride detection signal 116 is set to "0". For example, if the access instruction (the stride access instruction) 121 is fetched for the first time, the stride detection signal 116 is set to "1".

In step S912, the control circuit 110 determines whether the stride detection signal 116 is "1" or "0". If the control circuit 110 determines that the stride detection signal 116 is "1", the processing performed by the control circuit 110 proceeds to step S913. However, if the control circuit 110 determines that the stride detection signal 116 is "0", the control circuit 110 completes the processing, and, thereafter, repeats the processing for the next instruction.

In step S913, as illustrated in FIG. 8, the control circuit 110 writes a valid flag 811 indicating the validity to the entry in the entry section 810 indicated by the index register number 804 in the access instruction 122 into the history table 108. In addition, the control circuit 110 writes the stride width 117 as a stride width 812. Thereafter, the control circuit 110 completes the processing and, subsequently, repeats the processing for the next instruction.

In step S914, the instruction decode unit 103 decodes the indirect access instruction (the stride access instruction) into an internal instruction as a single instruction. The instruction decode unit 103 outputs the stride width 119, the operation code 112, and the register number 113. The register file 104 outputs the operand 114 to the effective address value computing unit 105 in accordance with the register number 113.

In step S915, under the control of the control circuit 110, the history table 108 outputs the hit signal 118 and the stride width 119 in accordance with the destination register number 802, as illustrated in FIG. 8.

In step S916, the control circuit 110 determines whether the hit signal 118 is "1" or "0". If the control circuit 110 determines that the hit signal 118 is "1", the processing performed by the control circuit 110 proceeds to step S917. However, if it is determined that the hit signal 118 is "0", the processing proceeds to step S918.

In step S917, the control circuit 110 deletes the entry corresponding to the destination register number 802 from the history table 108, and the processing proceeds to step S918.

In step S918, the effective address value computing unit 105 outputs the stride width 119, the effective addresses 115, and the operand 114 in accordance with the stride width 119, the operation code 112, and the operand 114. As in step S610 illustrated in FIG. 6, the memory access processing unit 106 performs accesses based on a stride access instruction to the data cache memory 107 in accordance with the stride width 119, the operation code 112, the effective addresses 115, and the operand 114. Thereafter, the control circuit 110 completes the processing and, subsequently, repeats the processing for the next instruction.

In step S919, the instruction decode unit 103 decodes the operation instruction, and the processing proceeds to step S915. In step S915, under the control of the control circuit 110, the history table 108 outputs the hit signal 118 and the stride width 119 in accordance with the destination register number 807 in the operation instruction, as illustrated in FIG. 8. Subsequently, in step S916, the control circuit 110 determines whether the hit signal 118 is "1" or "0". If the control circuit 110 determines that the hit signal 118 is "1", the processing performed by the control circuit 110 proceeds to step S917. However, if the control circuit 110 determines that the hit signal 118 is "0", the processing proceeds to step S918. In step S917, the control circuit 110 deletes, from the history table 108, the entry corresponding to the destination register number 807 in the operation instruction, and the processing proceeds to step S918. In step S918, the operation instruction receives the data indicated by the first source operand register number 808 and the data indicated by the second source operand register number 809, performs the operation indicated by the operation code 112, and writes the result of operation into the register indicated by the destination register number 807. Thereafter, the control circuit 110 completes the processing and, subsequently, repeats the processing for the next instruction.

As described above, when the indirect access instruction is a stride access instruction, the memory access processing unit 106 can access the data cache memory 107 at high speed.

Since the control circuit 110 deletes the entry indicated by the destination register number 802 from the history table 108, incorrect postulation as in the first embodiment can be avoided. Accordingly, the arithmetic processing unit is allowed not to perform the stride access verification process in step S611 of FIG. 6 and the cancellation process of the execution of the stride access instruction in steps S613 to S616.

The stride access detection circuit 109 operates only when the registration process with the history table 108 is performed in step S911. In this case, comparison with the stride width 119 is unnecessary. Accordingly, the comparator 308, the logical sum circuit 311, and the control signal 120 are unnecessary. Furthermore, since in step S906, the instruction decode unit 103 decomposes the indirect access instruction into a plurality of scalar access instructions and decodes the scalar access instructions, the arithmetic processing unit operates at low speed. Therefore, since the stride access detection circuit 109 can be a low speed operation circuit, the cost can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An arithmetic processing apparatus comprising:
a memory; and
a processor coupled to the memory, the processor:
  detects whether intervals of a plurality of addresses to be accessed by a memory access instruction that performs memory access to the plurality of addresses by a single instruction are all the same by using a detector including a plurality of subtractors which each performs a subtraction on two addresses of the plurality of addresses, a plurality of comparators which includes one comparator that compares an interval and one output of a plurality of outputs of the plurality of subtractors and other comparators that each compares two outputs of the plurality of outputs of the plurality of subtractors, a logical sum circuit which outputs a first logical sum of an output value of the one comparator and a control signal, which is set to a first value when detecting whether the intervals between any adjacent two of the plurality of addresses are all the same and is set to a second value when detecting whether the intervals between any adjacent two of the plurality of addresses are all the same and the interval is registered in a history table, and a logical product circuit which outputs a second logical sum value of output values of the other comparators when the control signal is the first value and outputs a third logical sum value of the output value of the one comparator and the output values of the other comparators when the control signal is the second value;
  decodes the memory access instruction as the single instruction when detecting that the intervals are all the same;
  decodes the memory access instruction as a plurality of instructions when detecting that the intervals are not all the same; and
  performs the memory access in accordance with the single instruction or the plurality of instructions.

2. The arithmetic processing apparatus according to claim 1, wherein the processor:
  registers information indicating that the intervals are all the same in the history table when detecting that the intervals are all the same;
  decodes the memory access instruction as the single instruction when the information is registered in the history table; and
  decodes the memory access instruction as the plurality of instructions by decomposing the memory access instruction to the plurality of instructions when the information is not registered in the history table.

3. The arithmetic processing apparatus according to claim 2, wherein the processor registers, in the history table, the information indicating that the intervals are all the same for each address of the memory access instruction.

4. The arithmetic processing apparatus according to claim 2, wherein the memory access instruction includes register numbers of first registers that record the plurality of addresses, and the processor registers, in the history table, the information indicating that the intervals are all the same for each of the register numbers of the first registers.

5. The arithmetic processing apparatus according to claim 4, wherein the memory access instruction includes a register number of a second register into which data at the plurality of addresses are loaded by the memory access instruction or from which data are stored in the plurality of addresses by the memory access instruction, and the processor deletes a registration of the information from the history table when the information is registered for the register number of the second register in the history table.

6. The arithmetic processing apparatus according to claim 4, wherein the processor:
  performs a scalar access instruction which performs memory access to one address and includes a register number of a third register that contains data loaded from one address by the scalar access instruction or data to be stored by the memory access instruction; and
  deletes a registration of information from the history table when the information is registered for the register number of the third register in the history table.

7. The arithmetic processing apparatus according to claim 2, wherein the processor:
  detects the intervals; registers, in the history table, information and the interval when detecting that the intervals are all the same; and
  performs the memory access in accordance with the intervals registered in the history table when the information is registered in the history table.

8. The arithmetic processing apparatus according to claim 2, wherein the processor:
  detects whether the intervals are all the same when the information is not registered in the history table; and
  registers, in the history table, the information when detecting that the intervals are all the same.

9. The arithmetic processing apparatus according to claim 2, wherein the processor:
  decodes the memory access instruction as the single instruction when the information is registered in the history table;
  detects whether the intervals are all the same;
  cancels the memory access based on the decoding of the memory access instruction when detecting the intervals are not the same;
  deletes a registration of the information from the history table; and
  decodes the memory access instruction by decomposing the memory access instruction to the plurality of instructions.

10. The arithmetic processing apparatus according to claim 1, wherein the plurality of addresses of the memory are accessed in parallel when the processor decodes the memory access instruction as the single instruction.

11. The arithmetic processing apparatus according to claim 10, wherein the memory includes:
  a plurality of memory banks storing data at the plurality of addresses, respectively;
  a first selector configured to select one of the memory banks in accordance with the respective addresses;
  a second selector configured to select an address in the memory bank in accordance with the respective addresses; and
  a multiplexer configured to load or store data at an address selected by the first selector and the second selector.

12. A method of controlling an arithmetic processing apparatus comprising:
  detecting, by a computer, whether intervals of a plurality of addresses to be accessed by a memory access instruction that performs memory access to the plurality of addresses by a single instruction are all the same by using a detector including a plurality of subtractors which each performs a subtraction on two addresses of the plurality of addresses, a plurality of comparators which includes one comparator that compares an interval and one output of a plurality of outputs of the plurality of subtractors and other comparators that each compares two outputs of the plurality of outputs of the plurality of subtractors, a logical sum circuit which outputs a first logical sum of an output value of the one comparator and a control signal, which is set to a first value when detecting whether the intervals between any adjacent two of the plurality of addresses are all the same and is set to a second value when detecting whether the intervals between any adjacent two of the plurality of addresses are all the same and the interval is registered in a history table, and a logical product circuit which outputs a second logical sum value of output values of the other comparators when the control signal is the first value and outputs a third logical sum value of the output value of the one comparator and the output values of the other comparators when the control signal is the second value;

decoding the memory access instruction as the single instruction when detecting that the intervals are all the same;

decoding the memory access instruction as a plurality of instructions when detecting that the intervals are not all the same; and performing the memory access in accordance with the single instruction or the plurality of instructions.

13. The method according to claim 12, further comprising:

registering information indicating that the intervals are all the same in the history table when detecting that the intervals are all the same;

decoding the memory access instruction as the single instruction when the information is registered in the history table; and decoding the memory access instruction as the plurality of instructions by decomposing the memory access instruction to the plurality of instructions when the information is not registered in the history table.

14. The method according to claim 13, wherein the information indicating that the intervals are all the same for each address of the memory access instruction is registered in the history table.

15. The method according to claim 13, wherein the memory access instruction includes register numbers of first registers that record the plurality of addresses, and the information indicating that the intervals are all the same for each of the register numbers of the first registers is registered in the history table.

16. The method according to claim 15, wherein the memory access instruction includes a register number of a second register into which data at the plurality of addresses are loaded by the memory access instruction or from which data are stored in the plurality of addresses by the memory access instruction, and a registration of the information is deleted from the history table when the information is registered for the register number of the second register in the history table.

17. The method according to claim 15, further comprising: performing a scalar access instruction which performs memory access to one address and includes a register number of a third register that contains data loaded from one address by the scalar access instruction or data to be stored by the memory access instruction; and deleting a registration of information from the history table when the information is registered for the register number of the third register in the history table.

18. The method according to claim 13, further comprising:

detecting the intervals;

registering, in the history table, information and the interval when detecting that the intervals are all the same; and performing the memory access in accordance with the intervals registered in the history table when the information is registered in the history table.

19. The method according to claim 13, further comprising:

detecting whether the intervals are all the same when the information is not registered in the history table; and registering, in the history table, the information when detecting that the intervals are all the same.

20. The method according to claim 13, further comprising:

decoding the memory access instruction as the single instruction when the information is registered in the history table;

detecting whether the intervals are all the same;

canceling the memory access based on the decoding of the memory access instruction when detecting the intervals are not the same;

deleting a registration of the information from the history table; and decoding the memory access instruction by decomposing the memory access instruction to the plurality of instructions.

* * * * *